United States Patent
Ramamoorthy et al.

(10) Patent No.: US 11,720,078 B2
(45) Date of Patent: Aug. 8, 2023

(54) SYSTEM FOR ADAPTIVE BANDWIDTH CONTROL OF ELECTRIC MOTORS USING FREQUENCY RESPONSE ANALYSIS METHOD

(71) Applicant: TEXAS INSTRUMENTS INCORPORATED, Dallas, TX (US)

(72) Inventors: Ramesh Tiruvannamalai Ramamoorthy, Sugar Land, TX (US); Sam Gnana Sabapathy, Sugar Land, TX (US); Manish Bhardwaj, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 152 days.

(21) Appl. No.: 17/176,290

(22) Filed: Feb. 16, 2021

(65) Prior Publication Data
US 2021/0181711 A1    Jun. 17, 2021

Related U.S. Application Data

(63) Continuation of application No. 16/403,156, filed on May 3, 2019, now Pat. No. 10,921,778.

(51) Int. Cl.
*G05B 19/408* (2006.01)
*H02P 21/22* (2016.01)
*H02P 27/12* (2006.01)

(52) U.S. Cl.
CPC .......... *G05B 19/4083* (2013.01); *H02P 21/22* (2016.02); *H02P 27/12* (2013.01); *G05B 2219/41238* (2013.01); *G05B 2219/41322* (2013.01)

(58) Field of Classification Search
CPC ...... G05B 19/4083; G05B 2219/41238; G05B 2219/41322; H02P 21/22; H02P 27/12; H02P 6/183; H02P 21/16; H02P 21/0003
See application file for complete search history.

(56) References Cited

U.S. PATENT DOCUMENTS

| | | | | |
|---|---|---|---|---|
| 4,527,101 A | * | 7/1985 | Zavis | G01P 3/48 318/245 |
| 10,319,360 B1 | * | 6/2019 | He | G10K 11/1752 |
| 2012/0038298 A1 | * | 2/2012 | Villwock | H02P 21/16 318/400.11 |
| 2013/0076286 A1 | * | 3/2013 | Patton | G10K 11/161 318/471 |
| 2015/0097500 A1 | * | 4/2015 | Magee | H02P 21/14 318/400.02 |

(Continued)

*Primary Examiner* — Muhammad S Islam
(74) *Attorney, Agent, or Firm* — Krista Y. Chan; Frank D. Cimino (57) ABSTRACT

A system comprising a processor, a non-transitory memory, and an application stored in the non-transitory memory is provided. The application is configured, upon execution by the processor, to cause the processor to generate a first controller signal based on a first set of feedback from an electric motor, based on a characterization tone, and based on a controller gain, to provide the first controller signal for operation of the electric motor, to generate a frequency response analysis on a second set of feedback from the electric motor in response to the first controller signal, and to determine a new value of the controller gain based on the frequency response analysis.

20 Claims, 5 Drawing Sheets

(56) References Cited

U.S. PATENT DOCUMENTS

| | | | |
|---|---|---|---|
| 2016/0097814 A1* | 4/2016 | Kuruppu | H02P 21/22 |
| | | | 324/522 |
| 2019/0201042 A1* | 7/2019 | Nott | A61B 18/1233 |
| 2019/0201046 A1* | 7/2019 | Shelton, IV | A61B 18/1442 |
| 2019/0274706 A1* | 9/2019 | Nott | A61B 17/3211 |

* cited by examiner

SYSTEM FOR ADAPTIVE BANDWIDTH CONTROL OF ELECTRIC MOTORS USING FREQUENCY RESPONSE ANALYSIS METHOD

CROSS-REFERENCE TO RELATED APPLICATIONS

This application is a continuation of U.S. patent application Ser. No. 16/403,156, filed May 3, 2019, which is incorporated by reference herein in its entirety.

BACKGROUND

Electric motors may be controlled by a variety of electronic equipment external to the electric motor itself to improve motor performance, to facilitate operation within safe limits, and to integrate the motor into a larger system, for example a computer numerical control (CNC) system or a robotic assembly process. A controller component may receive sensor feedback from the electric motor, receive an electric motor command input, and determine an electric motor command output based on the electric motor command input and on the electric motor feedback. An electric motor driver may receive the electric motor command output from the controller and drive the electric motor based on the electric motor command. For example, the electric motor driver may receive the electric motor command output in the form of a small signal (e.g., low voltage and/or low current) and use this small signal to modulate a high amplitude signal (e.g., high voltage and/or high current) to cause the motor to achieve the performance objectives signaled by the electric motor command input.

SUMMARY

In accordance with at least one example of the disclosure, a system comprises a processor, a non-transitory memory, and an application stored in the non-transitory memory. The application is configured, upon execution by the processor, to cause the processor to generate a first controller signal based on a first set of feedback from an electric motor, based on a characterization tone, and based on a controller gain, to provide the first controller signal for operation of the electric motor, to generate a frequency response analysis on a second set of feedback from the electric motor in response to the first controller signal, and to determine a new value of the controller gain based on the frequency response analysis.

In accordance with at least one example of the disclosure, a method of controlling an electric motor comprises receiving a first set of feedback from the electric motor by a processor executing a motor control application, receiving an electric motor speed command by the processor, generating a characterization tone by the processor, generating, by the processor, a first controller signal based on the first set of feedback, the characterization tone, the electric motor speed command, and a controller gain, outputting the first controller signal by the processor, receiving a second set of feedback from the electric motor by the processor, where the second set of feedback is based on the first controller signal, determining an electric motor windings resistance parameter and an electric motor inductance parameter by the processor based on a frequency component of the second set of feedback associated with the characterization tone, and determining, by the processor, a new value of the controller gain based on the determined electric motor windings resistance parameter and the determined electric motor windings inductance parameter, where the new value of the controller gain is usable to generate a second controller signal in a subsequent iteration of the motor control application.

In accordance with at least one example of the disclosure, a system comprises a processor, a non-transitory memory, and a field-oriented control (FOC) application stored in the non-transitory memory. The FOC application is configured, upon execution by the processor, to cause the processor to receive an indication of a motor position of an electric motor, to receive an indication of phase currents in the electric motor, to generate a characterization tone, to generate a first controller signal associated with electric motor torque and a second controller signal associated with electric motor magnetic flux, the first and second controller signals based on the indication of the motor position of the electric motor, the indication of phase currents in the electric motor, the characterization tone, and a controller gain, to generate pulse width modulation motor drive control signals based on the first controller signal and the second controller signal, to output the pulse width modulated motor drive control signals, to generate a frequency response analysis on the indication of phase currents in the electric motor, to separate a component of the frequency response analysis associated with the characterization tone, to determine an electric motor windings resistance parameter and an electric motor inductance parameter based on the component of the frequency response analysis associated with the characterization tone, to determine a new value of the controller gain based on the determined electric motor windings resistance parameter and the determined electric motor windings inductance parameter, and to store the new value of the controller gain, where the new value of the controller gain is usable to generate the controller signal in subsequent iterations of the application.

BRIEF DESCRIPTION OF THE DRAWINGS

For a detailed description of various examples, reference will now be made to the accompanying drawings in which.

DETAILED DESCRIPTION

Motor controllers generate motor control signals that are used to cause an electric motor to operate desirably, for example to perform an industrial process efficiently and safely. In examples, motor controllers may execute statically configured control algorithms that assume an expected range of motor operating conditions. Such statically configured control algorithms may perform sub-optimally beyond the expected range of operating conditions, for example when the electric motor is unusually cold or when the electric motor is unusually hot. Even over the expected range, such algorithms may not properly account for changes in device performance. For example, a motor control algorithm may rely upon a statically configured value of motor winding resistance and a statically configured value of motor winding inductance. In fact, however, motor winding resistance and motor winding inductance may change over time both as the operating environment of the electric motor changes (e.g., hot versus cold) and as the electric motor windings age. In some examples, to accommodate for such varying electric motor winding properties, statically configured motor control algorithms include wide safety margins that may restrict electric motor frequency bandwidth and/or reduce precision of motor control.

In some examples, systems and methods of the present disclosure determine electric motor operating parameters, including electric motor winding resistance and electric motor winding inductance, in near real-time and adapt the motor control algorithms accordingly, thereby improving the operating efficiency of the electric motor. In examples, a characterization signal or tone having a small amplitude (e.g., small amplitude relative to the amplitude of the motor controller signal) is included in the motor controller signal that commands the electric motor, frequency response analysis is performed on feedback values received from the electric motor, a component of the frequency response analysis associated with the characterization tone is separated from the feedback values, and operating parameters such as the winding resistance and winding inductance are determined based on the component of the frequency response analysis associated with the characterization tone. In examples, a characterization tone is chosen that has a frequency that is different from the operating frequency of the electric motor, whereby to better separate the component of the frequency response analysis associated with the characterization tone from the rest of the frequency response analysis. The operating parameters determined by the frequency response analysis may be used in a calculation in the controller algorithm to determine a gain or gains of the controller, and the controller may self-update its control algorithm with the newly determined gains. The operating parameters may be determined and the controller gains may be updated periodically, for example every five minutes or less.

Because of this dynamic adaptation of motor controller gains, the motor control algorithms may use reduced safety margins and/or an extended range of motor frequency bandwidth, and motor control may be more precise. Additionally, in examples, this system of determining electric motor operating parameters may be used to characterize and qualify electric motors in an electric motor manufacturing plant, for example to test the electric motors when they are manufactured. In examples, the system of determining electric motor operating parameters may be used to quickly identify a fault in an electric motor winding and to shut down the motor timely, reducing damage to the plant and/or avoiding injuries to operators.

Figure 1:
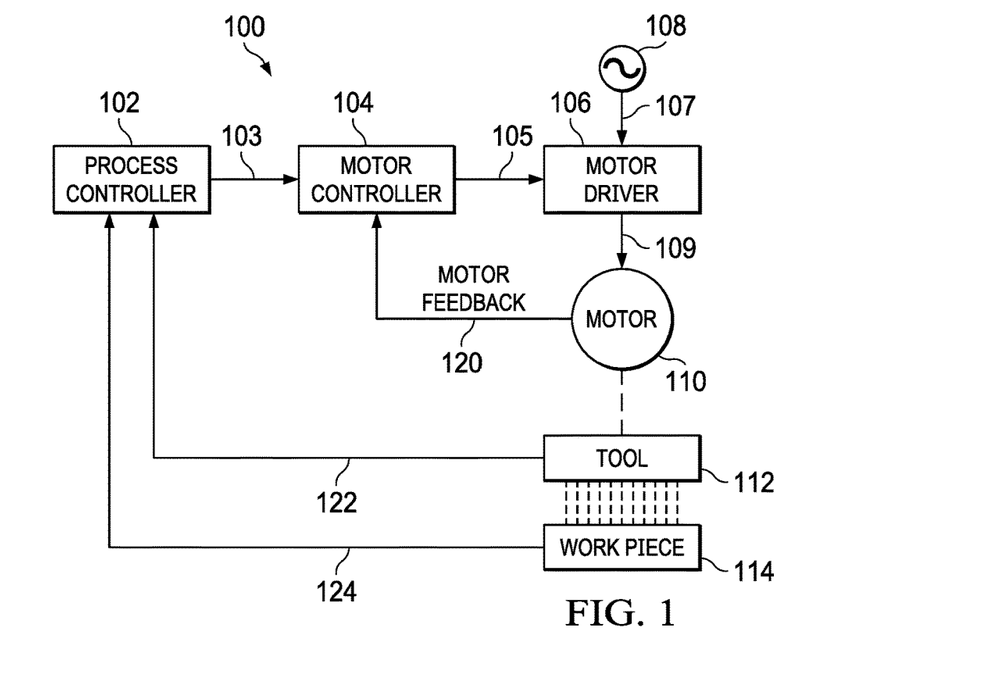
FIG. 1 shows an operating environment in accordance with various examples.

FIG. 1 depicts an example operating environment 100 involving an electric motor 110. The environment 100 may comprise a process controller 102 outputting a process command 103, a motor controller 104 outputting a motor controller signal 105, a motor driver 106, and the electric motor 110. In examples, the process command 103 is a motor speed command, a tool position command, or other process command. The electric motor 110 may be mechanically coupled to a tool 112, and the tool 112 driven by the electric motor 110 may engage with a work piece 114 that is the object of the operating environment 100. In an example, the electric motor 110 drives the tool 112 that is a saw blade to cut a shape in the work piece 114. In an example, the electric motor 110 drives the tool 112 that is an electric arc welder to weld the work piece 114. In an example, the electric motor 110 drives the tool 112 that is a lathe to cut a symmetrical shape in the work piece 114. In other operating environments 100, other tools 112 may engage with other work pieces 114 in different ways.

In examples, the motor driver 106 receives electric power 107 from an alternating current (AC) source 108, such as building mains electric power. The motor driver 106 may modulate delivery of motor power 109 to the electric motor 110, under the control of the motor controller signal 105, to cause the electric motor 110 to turn with a speed and/or torque commanded by the motor controller 104. In another example, the motor driver 106 receives electric power from a different power source, such as from a direct current (DC) electric power source.

Feedback may be provided from various parts of the environment 100 to the process controller 102 and to the motor controller 104. In examples, motor feedback 120 is provided to the motor controller 104. In examples, the motor feedback 120 comprises an indication of motor position of the electric motor 110, for example an indication of a position of a rotor of the electric motor 110. In examples the motor feedback 120 comprises an indication of phase currents of the electric motor 110. In examples, the motor feedback 120 comprises a phase-1 current feedback, a phase-2 current feedback, and a phase-3 current feedback, where the electric motor 110 is driven by three-phase AC electric power from the motor driver 106. Tool position feedback 122 may be provided to the process controller 102 from the tool 112. In examples, work piece feedback 124 is provided to the process controller 102 from the environment 100.

Figure 2:
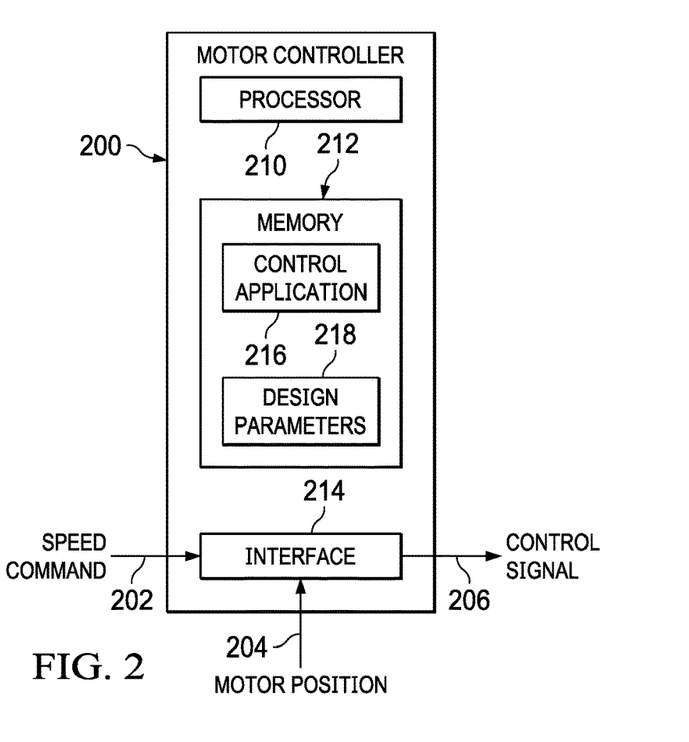
FIG. 2 shows a motor controller in accordance with various examples.

FIG. 2 shows a motor controller 200, which may be substantially similar to motor controller 104 above, that may receive a process command 202, receive an indication of motor position 204 of the electric motor, and output a motor controller signal 206. In an example, the indication of motor position 204 is an indication of a position of a rotor of the motor. In examples, the motor controller 200 comprises a processor 210, a memory 212, and an interface 214. The processor 210 may be a microprocessor unit (MPU), a microcontroller unit (MCU), a central processing unit (CPU), a digital signal processor (DSP), a field programmable gate array (FPGA), a complex programmable logic device (CPLD), an application specific integrated circuit (ASIC), or other processor. In examples, the motor controller 200 is an integrated circuit. In examples, the motor controller 200 is implemented as a system on a chip (SoC). In some contexts, the motor controller 200 may be referred to as a system.

In examples, the memory 212 comprises a non-transitory memory portion that stores a motor controller application 216 and optionally one or more design parameters 218. In an example, the design parameters comprise a frequency response or a maximum operating frequency of the electric motor 110 and/or the system 100. In an example, the design parameters comprise a maximum torque of the electric motor 110. In an example, the design parameters comprise a maximum current provided to the electric motor 110. In examples, the motor controller application 216 is code, a computer program, a compiled and linked computer program, software, firmware, or other logic. The motor controller application 216 may comprise a plurality of instructions that the processor 210 can execute sequentially to accomplish the purpose of generating the motor controller signal 206. In examples, the memory 212 comprises a transitory memory portion such that data stored in the transitory memory portion is lost when electric power is removed from the memory 212. While in FIG. 2, the memory 212 is illustrated as separate from the processor 210, in examples the memory 212 is internal to the processor 210. In examples, the motor controller application 216 may be manufactured into the motor controller 200 when it is manufactured. In another example, the motor controller application 216 is stored in the memory 212 after the motor controller 200 has been manufactured.

In examples, the design parameters 218 are stored in the non-transitory portion of the memory 212 by system designers or others to configure the motor controller for use in a particular environment 100. For example, the motor controller 200 may be configured for use in a first particular environment 100, while another instance of the motor controller 200 may be configured for use in a second, different particular environment 100. In examples, the design parameters identify an electric motor control frequency bandwidth, and the electric motor control frequency bandwidth is used by the motor controller application 216 to determine one or more gains in a control loop performed by the motor controller application 216.

In examples, the processor 210 executes the motor controller application 216 out of the non-transitory portion of memory 212. Alternatively, in examples, the processor 210 copies at least portions of the motor controller application 216 to the transitory portion of memory 212, and executes instructions of the motor controller application 216 fetched from the transitory portion of memory 212. In other examples, the motor controller application 216 is implemented within the processor 210, where the processor is an application specific integrated circuit (ASIC).

In examples, the interface 214 receives the process command 202 as a digital input and provides this input to the processor 210 for use by the motor controller application 216. In examples, the interface 214 receives the indication of motor position 204 as an analog signal, converts the analog signal to a digital signal, and provides the digital signal to the processor 210 for use by the motor controller application 216. In another example, the interface 214 receives the indication of motor position 204 as a digital signal and provides the digital signal to the processor 210 for use by the motor controller application 216. The processor 210, based on executing the motor controller application 216, may generate a motor controller signal that it provides to the interface 214, and the interface 214 transcodes or transforms the motor controller signal into a motor controller signal 206 that is suitable for use by the motor driver 106. In another example the motor controller signal 206 is digital. In examples, the motor controller signal 206 comprises a phase-1 pulse width modulated signal, a phase-2 pulse width modulated signal, and a phase-3 pulse width modulated signal. The interface 214 may comprise digital inputs and/or analog inputs. The interface 214 may comprise digital outputs and/or analog outputs.

Figure 3:
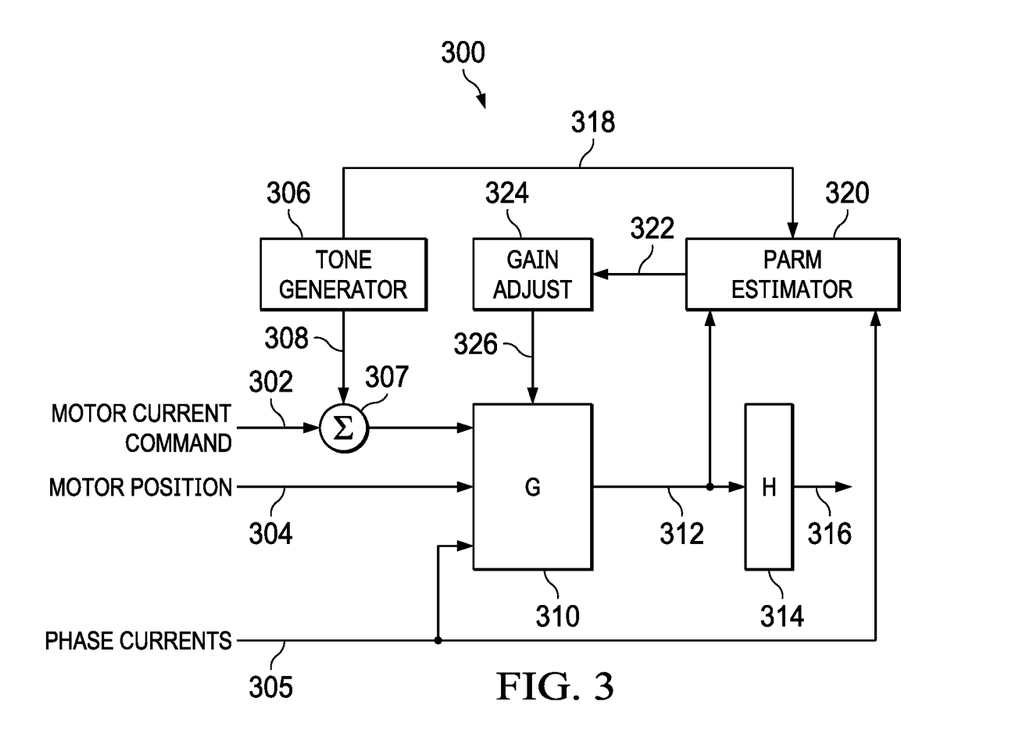
FIG. 3 shows a motor controller process block diagram in accordance with various examples.

FIG. 3 shows a motor controller algorithmic architecture 300. The architecture 300 illustrates the process of generating a motor controller signal 316 (this corresponds to the motor controller signal 105 represented in FIG. 1 and the motor controller signal 206 represented in FIG. 2 and described in the associated descriptive text) based on a motor current command 302, based on an indication of a motor position 304, and based on an indication of phase currents 305. In an example, the motor 110 is a three phase motor and is provided three phase current from the motor driver 106. Said in other words, in an example, the motor 110 comprises a first phase winding, a second phase winding, and a third phase winding, and the first phase winding is provided a first phase current from the motor driver 106, the second phase winding is provided a second phase current from the motor driver 106, and the third phase winding is provided a third phase current from the motor driver 106. In another example the motor controller signal 316 is generated based on command inputs other than current command 302, for example based on motor speed or motor position.

In an example, the indication of the motor position 304 comprises an indication of a position of a rotor of the motor 110, for example an angular position of the rotor. The architecture 300 may comprise a summation junction 307, a controller block 310, a signal conditioner block 314, a parameter estimator block 320, a gain adjust block 324, and a tone generator block 306. In examples, the summation junction 307 and the blocks 310, 314, 320, 324, and 306 are implemented in software, firmware, or other logic that is executed by the processor 210.

In operation, a motor current command 302 may be input to the summation junction 307 and passed on to the controller block 310 (note that in some operation modes, a characterization signal or tone is not summed with the motor current command 302 in the summation junction, for example when a parameter estimation and gain adjustment session is not active). The gain block 310 may process the motor current command 302 with feedback from the motor 110 including the indication of motor position 304 and the indication of phase currents 305. The gain block 310 may process these inputs based, at least in part, on a gain which has been determined based on an estimated value of electric motor windings resistance and based on an estimated value of electric motor windings inductance. The gain block 310 may send a gain signal 312 to the signal conditioner block 314 and to the parameter estimator block 320. The gain signal 312 is the output of the processing of the gain block 310. In examples, the gain block 310 does not send the gain signal 312 to the parameter estimator block 320 when a parameter estimation and gain adjustment session is not active.

The signal conditioning block 314 may process the gain signal 312 to determine the motor controller signal 316. The signal conditioning block 314 may condition the gain signal 312 in one or more ways. In examples, the signal conditioning block 314 transforms the gain signal 312 into a pulse width modulation signal. In examples, the signal conditioning block 314 transforms the gain signal 312 into a phase-1 motor controller signal, a phase-2 motor controller signal, and a phase-3 motor controller signal, whereby to control three phase current to the electric motor 110 from the motor driver 106. In examples, the signal conditioning block 314 transforms digital inputs (e.g., the gain signal 312 may comprise one or more digital signals that are an input to the signal conditioning block 314) from the gain block 310 into outputs to drive the motor driver 106.

The processing performed when a characterization signal is summed with the motor current command 302 may be substantially similar to the processing described above, with the exception that the processing is performed on the superposition or sum of the motor current command 302 and a characterization tone 308 produced by the tone generator block 306. The characterization tone 308 may be produced by the tone generator block 306 with a known amplitude and with a known frequency. In an embodiment, the characterization tone 308 may be a low amplitude signal having a frequency of about 800 Hz, about 1 kHz, about 1.5 kHz, about 2 kHz, about 2.5 kHz, or some other frequency. In an example, the characterization tone 308 is a sinusoidal signal having a frequency in the range of 800 Hz to 2500 Hz. In examples, the characterization tone 308 is a decade or two decades higher in frequency than the operating frequency of the electric motor 110. In an example, the characterization tone 308 may have a bandwidth of about 100 Hz, of about 50 Hz, or about 25 Hz, or some other bandwidth (e.g., the characterization tone 308 may not be a perfect, single pure tone).

When a parameter estimation and gain adjustment session is active (e.g., when the characterization tone 308 is generated by the tone generator block 306 and summed by the summing junction 307 with the motor current command 302), the parameter estimator block 320 may receive and process the gain signal 312 and the indication of phase currents 305 to perform a frequency response analysis, for example performing a digital Fourier transform on the gain signal 312 to derive a voltage spectrum and performing a digital Fourier transform on the indication of phase currents 305 to derive a current spectrum. The parameter estimator block 320 may separate a voltage component and a current component of the frequency response analysis associated with the characterization tone.

The components of the frequency response analysis associated with the characterization tone may be frequencies in a frequency band around the nominal frequency of the characterization tone, and in some examples, the frequency band is from 30% less than the nominal frequency of the characterization tone to 30% greater than the nominal frequency of the characterization tone. For example, if the nominal frequency of the characterization tone is 2 kHz, the frequency components of the frequency response analysis associated with the characterization tone may be considered to constitute a frequency band from 1.4 kHz to 2.6 kHz. In some examples, the components of the frequency response analysis associated with the characterization tone may be frequencies in a frequency band from 15% less than the nominal frequency of the characterization tone to 15% greater than the nominal frequency of the characterization tone. Those components of the frequency response analysis that fall outside of the characterization tone frequency band may be determined to be associated with and in response to the motor command 302.

The parameter estimator block 320 may determine operating parameters such as an electric motor windings resistance and inductance based on these components of the frequency response analysis associated with the characterization tone. In examples, the resistance and inductance of the electric motor windings are determined based on the relationships:

$$R = C_1 \frac{C_2\left(\frac{I_r}{V_r}\right) + C_3\left(\frac{I_i}{V_i}\right)}{\left(\frac{I_r}{V_r}\right)^2 + \left(\frac{I_i}{V_i}\right)^2} \quad \text{EQ 1}$$

$$L = \frac{C_1}{2\pi f} \frac{C_3\left(\frac{I_r}{V_r}\right) - C_2\left(\frac{I_i}{V_i}\right)}{\left(\frac{I_r}{V_r}\right)^2 + \left(\frac{I_i}{V_i}\right)^2} \quad \text{EQ 2}$$

where R is the value of electrical resistance in the electric motor windings, $I_r$ is the real part of the electrical current of the frequency response analysis associated with the characterization tone, $I_i$ is the imaginary part of the electrical current of the frequency response analysis associated with the characterization tone, $V_r$ is the real part of the voltage of the frequency response analysis associated with the characterization tone, $V_i$ is the imaginary component of the voltage of the frequency response analysis associated with the characterization tone, $C_1$ is a constant associated with the particulars (e.g., physical plant constant) of the motor driver 106 and the electric power 107, $C_2$ is a constant associated with a real component of a delay in the motor driver 106, $C_3$ is a constant associated with an imaginary component of a delay in the motor driver 106, I is the value of electrical inductance in the electric motor windings, and f is the frequency of the characterization tone. In examples, $C_1$ is determined as the product of voltage amplitude of electric power 107 as expressed in "per unit" values, an amplification gain of the motor driver 106, a 0.5 value (e.g., a basic gain of a two-level inverter), and a 1.15 value.

The parameter estimator block 320 may provide the newly estimated values of the operating parameters to the gain adjustment block 324. The gain adjustment block 324 may determine a new value of controller gain based on the new operating parameters. The gain adjustment block 324 may store the new value of controller gain in the gain block 310, and the gain block may use the new controller gain value in future iterations (e.g., in subsequent iterations) of determining the gain signal 312. In examples, the controller gain may be determined based on the relationship:

$$G = C_4\left[\frac{R + sL}{s}\right] \quad \text{EQ 3}$$

where G is the controller gain, R is the value of electrical resistance in the electric motor windings, L is value of electrical inductance in the electric motor windings, S is the Laplace variable, $C_4$ is a constant given by:

$$C_4 = \frac{2\pi F_{BW}}{C_1} \quad \text{EQ 4}$$

$F_{BW}$ is the control frequency bandwidth of the electric motor 110 (e.g., a design parameter), and $C_1$ is a constant defined above with reference to EQ 1.

The motor controller application 216 may perform a parameter estimation and gain adjustment session periodically, for example about once every minute, about once every three minutes, about once every ten minutes, or at some other periodic interval. In examples, the motor controller application 216 performs the parameter estimation and gain adjustment session at least every 10 minutes. By periodically estimating parameters and adjusting gains, the performance of the motor controller 104 can adapt to changing environmental conditions such as temperature of the electric motor 110, and thereby maintain near optimal control of the electric motor 110. The parameter estimation and gain adjustment session may be referred to as a parameter estimation cycle. In an example, the motor controller application 216 generates a first controller signal based on a first set of feedback from an electric motor, based on a characterization tone, and based on a controller gain, provides the first controller signal for operation of the electric motor, generates a frequency response analysis on a second set of feedback from the electric motor in response to the first controller signal, and determines a new value of the controller gain based on the frequency response analysis.

Figure 4A:
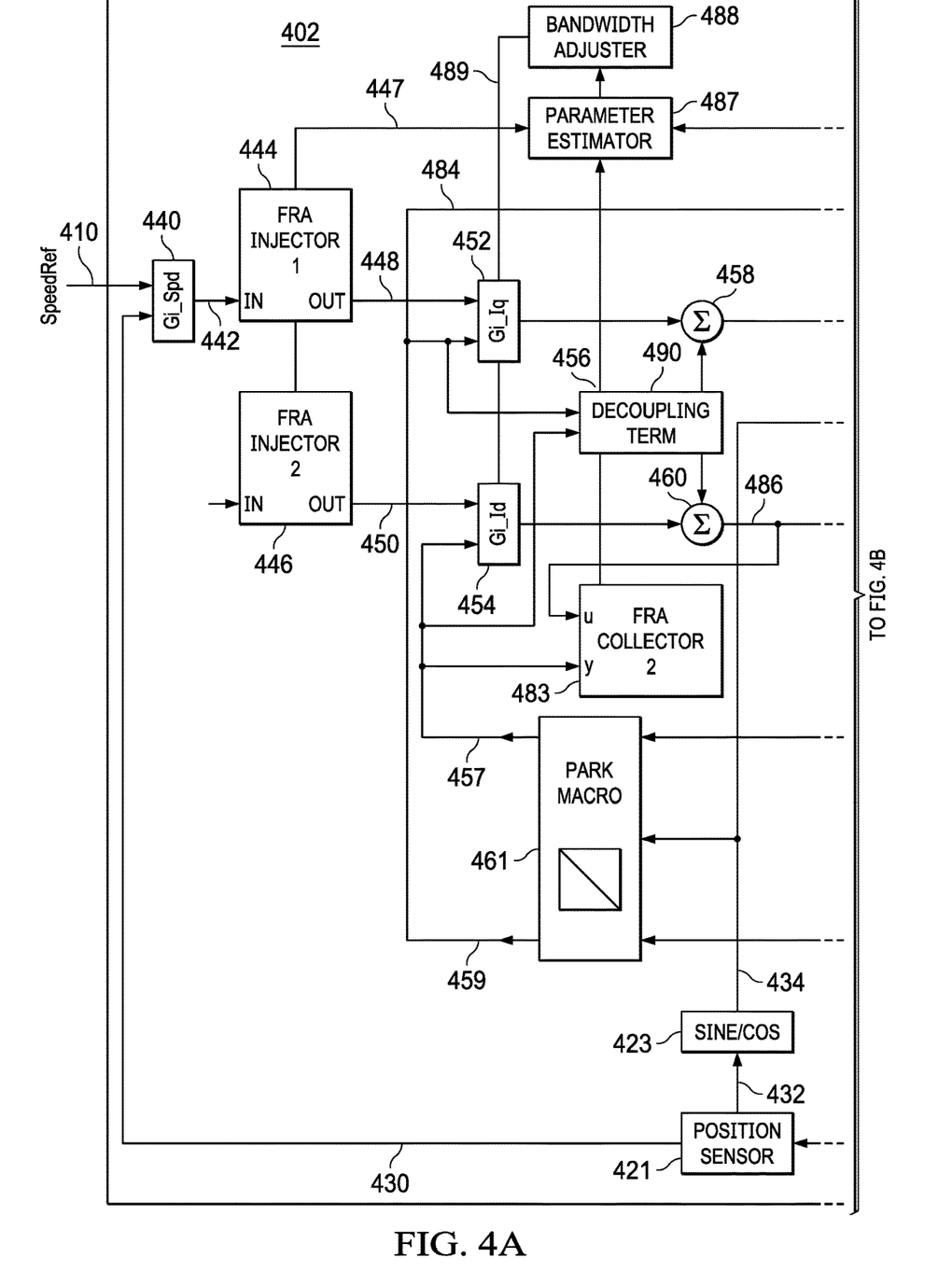
FIG. 4A and FIG. 4B show another motor controller process block diagram in accordance with various examples.
Figure 4B:
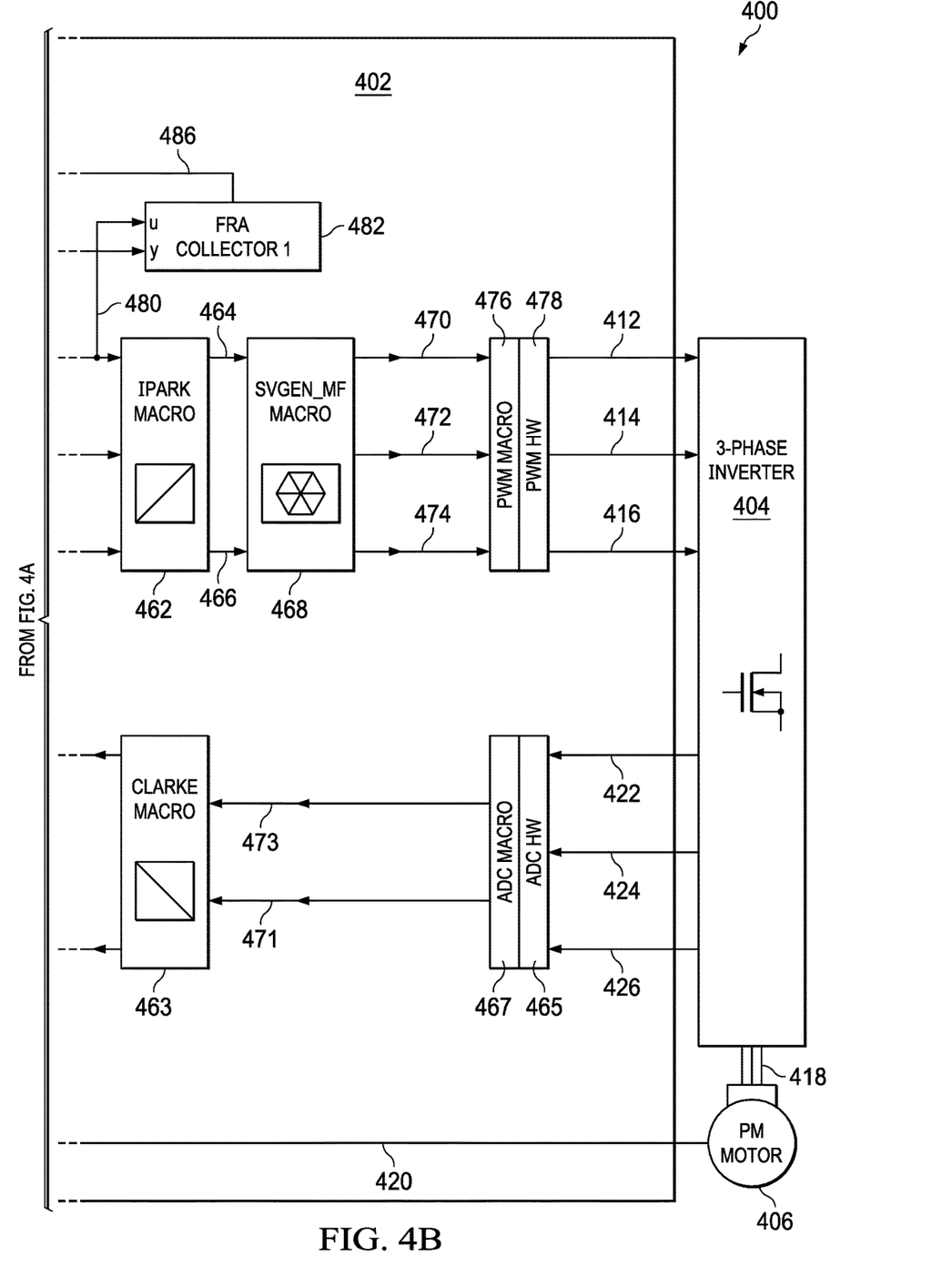

FIG. 4A and FIG. 4B show a control system 400. In examples the system 400 comprises a motor controller 402, a motor driver 404, and an electric motor 406. In examples, the control system 400 can be used in an environment such as the operating environment 100 described above with reference to FIG. 1 and the motion controller 402, the motion driver 404 and the electric motor 406 may be similar to those described above. The electric motor 406 may be an alternating current (AC) electric motor. The electric motor 406 may be an AC induction motor. The electric motor 406 may be a permanent magnet synchronous electric motor.

The motor controller 402 may receive a command input 410, for example a motor speed command, a motor speed reference, a position command, a current command, and/or a torque command. In examples, the motor controller 402 has an algorithmic structure that is consistent with the higher-level algorithmic structure of the motor controller algorithmic architecture 300 described above with reference to FIG. 3. The command input 410 may be received from, for example, a process controller such as the process controller 102 as illustrated in FIG. 1. The motor controller 402 may output one or more controller signals to the motor driver 404 associated with one or more power phases, for example a phase-1 pulse width modulated (PWM) control signal 412, a phase-2 PWM control signal 414, and a phase-3 PWM control signal 416.

In examples, the motor controller 402 is implemented as an integrated circuit. In examples, the motor controller 402 is implemented as a micro controller unit (MCU), a microprocessor unit (MCU), a computer processor unit (CPU), a digital signal processor (DSP), a field programmable gate array (FPGA), a complex programmable logic device (CPLD), an application specific integrated circuit (ASIC), or as another semiconductor logic or mixed signal device. In examples the motor controller 402 is similar in structure to the motor controller 200 described above with reference to FIG. 2.

The motor driver 404 may receive the controller signals 412-416 from the motor controller 402, and, in response, output motor power to the electric motor 406, for example a three-phase motor power signal 418. The motor driver 404 may perform the function of an amplifier, amplifying the PWM control signals 412, 414, 414 to produce the three-phase motor power signal 418 to drive the electric motor 406. The motor driver 404 may also provide current feedback to the motor controller 402 using one or more feedback signals, for example a phase-1 electric current feedback signal 422, a phase-2 electric current feedback signal 424, and a phase-3 electric current feedback signal 426. The current feedback signals 422-426 may provide an indication of electric currents in the electric motor 406, for example currents in the windings of the electric motor 406. The electric motor 406 may send motor position feedback 420 to the motor controller 402. In an example, this motor position feedback 420 may indicate a rotor position of the electric motor 110. The motor position feedback 420 may provide an indication of a position of the electric motor 406, for example an angular position of a rotor of the electric motor 406

The motor controller 402 may comprise a speed controller 440, a first frequency response analysis (FRA) characterization tone injector component 444, a second FRA characterization tone injector component 446, a quadrature current loop controller 452, a direct current loop controller 454, an IPark Macro component 462, a SVGEN MF Macro component 468, a pulse width modulation (PWM) macro component 476, and a PWM hardware component 478. The motor controller 402 also may comprise a first FRA collector component 482, a second FRA collector component 483, a parameter estimator component 487, and a bandwidth adjustor component 488. The motor controller 402 also comprises an analog-to-digital conversion (ADC) hardware component 465, an ADC macro component 467, and a position sensor component 421.

In examples, the PWM hardware component 478 and the ADC hardware component 465 may be implemented in hardware, for example may be provided as an interface hardware component of the motor controller 402. The other components or processing blocks 440, 444, 446, 452, 454, 461, 462, 463, 467, 468, 476, 482, 483, 487, and 488 may be implemented as algorithmic processing blocks within the motor controller 402, for example implemented in software or firmware executing on a processor of the motor controller 402 or implemented in hardware logic such as application specific integrated circuit (ASIC) logic. In an example, the position sensor component 421 may be implemented as a hardware component and/or an algorithmic processing block. In examples, the motor controller 402 has additional algorithmic processing blocks not identified above. In examples, two or more of the algorithmic processing blocks identified separately above and described hereinafter may be combined into a single algorithmic processing block.

The position sensor component 421 may process the motor position feedback 420 to produce a rotor speed feedback 430. The speed controller 440 may compare the value of the speed reference provided by the command input 410 to the rotor speed feedback 430 to determine a speed error between the two. The speed controller 440 may produce a speed controller output 442 based on the speed error and based on a speed controller gain configured into the speed controller 440. The speed controller output 442 may be a reference that indicates a target or desired quadrature current (e.g., Iq reference).

In a mode of operation, when motor parameter estimation is inactive, the speed controller output 442 may pass through or bypass the first FRA injector component 444 and be input to the quadrature current loop controller 452 along with a quadrature current feedback 459 output by the Park macro component 461. In examples, the motor controller 402 executes a field-oriented control (FOC) algorithm or a vector control algorithm. In FOC theory a coordinate system with orthogonal components along a direct (d) axis and a quadrature (q) axis is used. References herein to quadrature current (Iq) and direct current (Id) relate to these orthogonal FOC components. The quadrature current loop controller 452 may compare the speed controller output 442 (e.g., a quadrature current reference value Iq) to the quadrature current feedback 459 to determine a quadrature current error. The quadrature current loop controller 452 may produce a quadrature current control signal 480 based on the quadrature current error and based on a quadrature current loop controller gain configured into the quadrature current loop controller 452. The quadrature current control signal 480 may be a bi-polar signal (e.g., a direct current (DC) signal). In some examples of the present disclosure, the quadrature current loop controller gain is dynamically determined based on dynamic estimation of electric motor operating parameters (e.g., winding resistance and winding inductance) and dynamically updating the configured quadrature loop controller gain stored in the quadrature current loop controller 452. The updated quadrature current loop controller gain may be used in subsequent executions of the motor controller 402. The quadrature current loop controller 452 may output the quadrature current control signal 480 to the IPark macro component 462. The quadrature current control signal 480 can be considered to provide a commanded electric motor torque value.

In a mode of operation, when motor parameter estimation is inactive, a direct current reference 453 (e.g., Id reference) passes through or bypasses the second FRA injector component 446 and is input to the direct current loop controller 454 along with a direct current feedback 457 output by the Park macro component 461. The direct current loop controller 454 may produce a direct current control signal 486 based on the direct current error and based on a direct current loop controller gain configured into the direct current loop controller 454. The direct current control signal 486 may be a non-negative signal (e.g., a direct current (DC)). In some examples of the present disclosure, the direct current loop controller gain is dynamically determined based on dynamic estimation of electric motor parameters (e.g., winding resistance and winding inductance) and dynamically updating the configured direct loop controller gain stored in the direct current loop controller 454. The direct current loop controller 452 may output the direct current control signal 486 to the IPark macro component 462. The direct current control signal 486 can be considered to be a commanded electric motor magnetic flux value.

The position sensor component 421 described above may provide a rotor angle feedback 432 to a sine/cosine processor 423 to produce sine and cosine of a rotor angle feedback 434, and the IPark macro component 462 may generate a phase-1 signal 464 and a phase-2 signal 466 from the quadrature current control signal 480 and from the direct current control signal 486 as well as the sine and cosine of the rotor angle feedback 434, where the phase-1 signal 464 and the phase-2 signal 466 represent AC sinusoids that are 90 degrees out of phase with each other. The IPark macro component 462 may provide the phase-1 signal 464 and the phase-2 signal 466 to the SVGen MF Macro component 468. The SVGen MF Macro component 468 (e.g., a phase-vector generator) may convert the 2-phase AC signals 464, 466 to three 3-phase AC signals a phase-1 pulse AC signal 470, a phase-2 AC signal 472, and a phase-3 AC signal 274 based on the phase-1 signal 464 and the phase-2 signal 466 and outputs the AC signals 470, 472, 474 to the pulse width modulation macro component 476. The pulse width modulation macro component 476 may convert the three 3-phase AC signals 470, 472, 474 to digital representations of pulse width modulated signals and provide these to the pulse width modulation hardware 478, which may generate from them the phase-1 pulse width modulated (PWM) control signal 412, the phase-2 PWM control signal 414, and the phase-3 PWM control signal 416.

Processing the three phase motor current feedback 422, 424, 426 first using the Clark macro 463 and then using the Park macro may complete a direct-quadrature-zero transformation on the three phase current feedback to a direct-quadrature reference frame. By transforming three phase current feedback to the direct-quadrature reference frame, motor control calculations performed by the motor controller 402 (e.g., processing with the quadrature current loop controller 452 and the direct current loop controller 454) can be simplified to generate motor controller commands in the direct-quadrature reference frame. The quadrature current control signal 480 and the direct current control signal 486 may then be transformed by the IPark macro component 468 (e.g., performing an inverse Park transform) to produce a phase-1 signal 464 (a first AC sinusoidal signal) and the phase-2 signal 466 (a second AC sinusoidal signal) that are 90 degrees out of phase with each other. The SVGen MF Macro component 468 (e.g., a phase-vector generator) may then convert these 2-phase AC signals 464, 466 to 3-phase signals 470, 472, 474 (3 AC sinusoids 120 degrees out of phase with each other).

During cycles of the motor controller 402 when motor parameter estimation is active, the first FRA injector 444 may generate a small amplitude characterization tone or sinusoid signal that is added to the larger amplitude speed controller output 442 before it is input as the quadrature current reference signal 448 to the quadrature controller component 452. The first FRA injector 444 may generate the characterization tone with a known amplitude in one or more known frequencies. The contribution of the characterization tone to the behavior of the electric motor 406 can be separated out by performing a frequency response analysis on the quadrature current control signal 480 and the quadrature current feedback 459. The first FRA collector component 482 receives the quadrature current control signal 480 and the quadrature current feedback 459 and provides them to the parameter estimator 487. It is noted that the quadrature current control command 480 represents quadrature voltage (Vq) and the quadrature current feedback 459 represents quadrature current (Iq).

The parameter estimator component 487 may process the quadrature voltage and the quadrature current and separate the components that correspond to the characterization tone. In examples, the characterization tone is at a higher frequency than the motor operating frequency, for example at a frequency of 800 Hz, at a frequency of 1 kHz, at a frequency of 1.5 kHz, at a frequency of 2 kHz, or at a frequency of 2.5 kHz. In an example, the characterization tone is a sinusoidal signal having a frequency in the range of 800 Hz to 2500 Hz. The parameter estimator component 487 may estimate the resistance and inductance of the windings of the electric motor 406 based on the components of the quadrature voltage and the quadrature current using the methods discussed above with reference to FIG. 3 and as represented in EQ 1 and EQ 2. The parameter estimator component 487 may output the estimated current values of winding resistance R and winding inductance L to the bandwidth adjuster component 488. The bandwidth adjuster component 488 may determine a quadrature current control loop gain using the methods discussed above with reference to FIG. 3 and as represented in EQ 3 and EQ 4. The bandwidth adjuster component 488 may then revise the quadrature current control loop gain in the quadrature current loop controller 452 with the new gain value. The revised quadrature current control loop gain may be used in subsequent executions of the motor controller 402. In examples, the bandwidth adjuster component 488 copies the same quadrature current control loop gain into the direct current loop controller 454.

In examples, during cycles of the motor controller 402 when motor parameter estimation is active, the second FRA injector 446 generates a small amplitude characterization tone or sinusoid signal that is added to the larger amplitude direct current reference signal 453 before it is input as the direct current reference 458 to the direct current loop controller component 454. The second FRA injector 446 may generate the characterization tone with a known amplitude and one or more known frequencies. The contribution to the characterization tone to the direct current control signal 486 on behavior of the electric motor 406 can be separated out by performing frequency response analysis on the direct current control signal 486 and the direct current feedback 457. The second FRA collector component 483 may receive the direct current control signal 486 and the direct current feedback 457 and provide them to the parameter estimator 487. The direct current control command 486 may represent direct voltage (Vd) and the direct current feedback 457 may represent direct current (Id).

The parameter estimator component 487 may process the direct voltage and the direct current and separate the components that correspond to the characterization tone. In examples, the characterization tone is at a higher frequency than the motor operating frequency, for example at a frequency of 800 Hz, at a frequency of 1 kHz, at a frequency of 1.5 kHz, at a frequency of 2 kHz, or at a frequency of 2.5 kHz. In examples, the characterization tone is a sinusoidal signal having a frequency in the range of 800 Hz to 2500 Hz. The parameter estimator component 487 may estimate the resistance and inductance of the windings of the electric motor 406 based on the components of the direct voltage and the direct current using the methods discussed above with reference to FIG. 3 and as represented in EQ 1 and EQ 2. The parameter estimator component 487 may output the estimated current values of winding resistance R and winding inductance L to the bandwidth adjuster component 488. The bandwidth adjuster component 488 may determine a direct current control loop gain using the methods discussed above with reference to FIG. 3 and as represented in EQ 3 and EQ 4. The bandwidth adjuster component 488 then may revise the direct current control loop gain in the direct current loop controller 452 with the new gain value. The revised direct current control loop gain may be used in subsequent executions of the motor controller 402.

The motor controller 402 may execute the motor parameter estimation process and update the quadrature current loop gain into the quadrature current loop controller component 452 and update the direct current loop gain into the direct current loop controller component 454 once per minute, once every three minutes, once every five minutes, once every ten minutes, or on some other periodic basis. In examples, the motor controller executes the motor parameter estimation process and updates the quadrature current loop gain at least every ten minutes. The motor parameter estimation process may take place during active control of the electric motor 406: in examples, the operation of the electric motor 406 does not stop or degrade while the motor parameter estimation process is underway. In examples, the first FRA collector 482 and the second FRA collector 483 collect data from fifty or more cycles of the electric motor 406 to build a data sample sufficient for performing the frequency response analysis.

In examples, the motor controller 402 executes algorithms that detect failure conditions of the electric motor 406. In some examples, the motor controller 402 detects a winding open circuit based on the determination of the resistance of the winding and/or detects a winding short circuit based on the determination of the resistance of the winding. In an example, a winding short circuit condition may be determined when the resistance of the winding is significantly reduced while still not zero estimated resistance. In an example, a winding short circuit condition may be determined based on an inductance of the winding that is significantly reduced. The motor controller 402 can shut down or shut off the electric motor 406 when it determines a motor winding has an open circuit. The motor controller 402 can shut down or shut off the electric motor 406 when it determines a motor winding is short circuited or at least partially short circuited.

Figure 5:
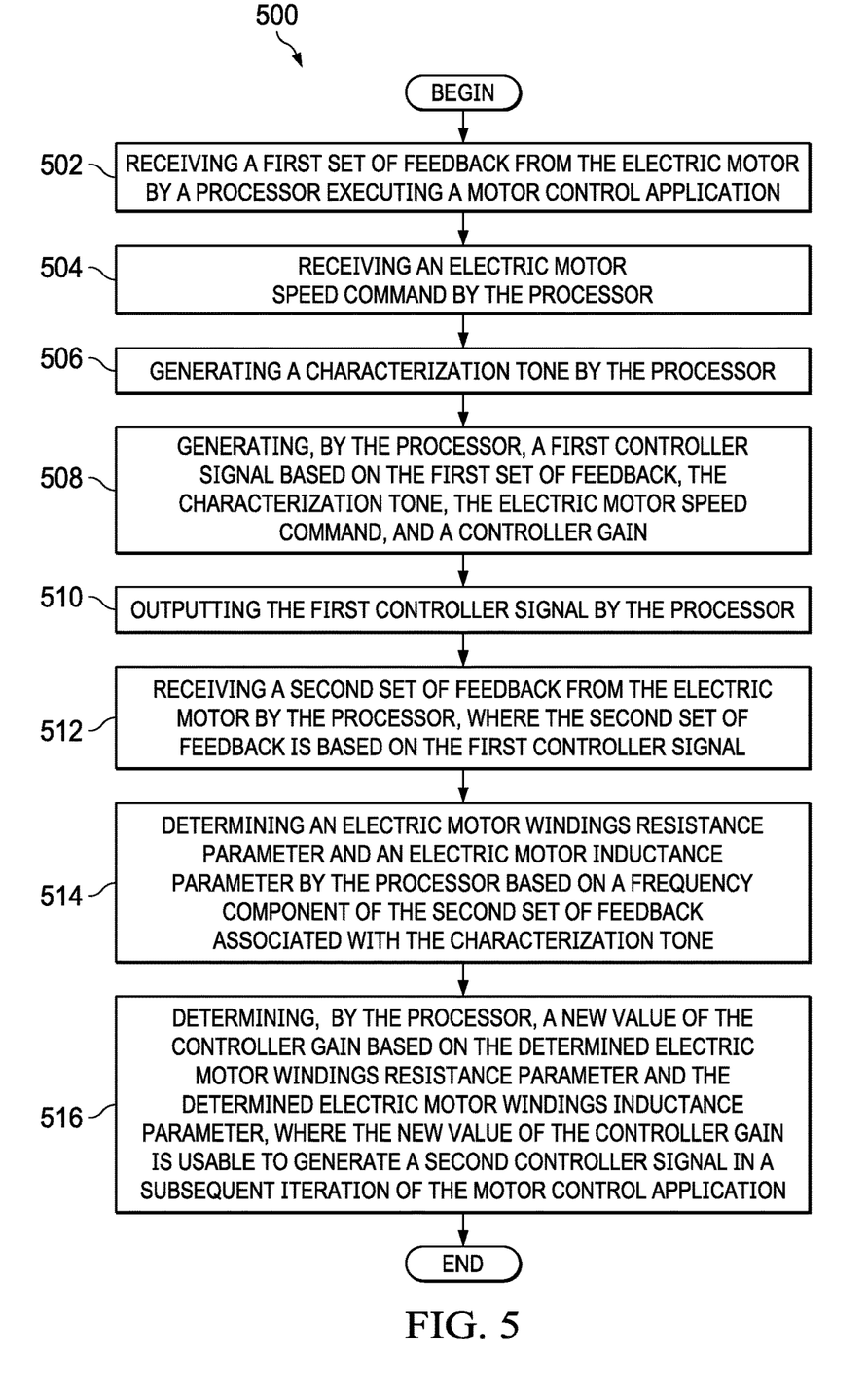
FIG. 5 shows a flow chart of a method in accordance with various examples.

Turning now to FIG. 5, a method 500 of controlling an electric motor is described. At block 502, the method 500 comprises receiving a first set of feedback from the electric motor by a processor executing a motor control application. At block 504, the method 500 comprises receiving an electric motor speed command by the processor. At block 506, the method 500 comprises generating a characterization tone by the processor. At block 508, the method 500 comprises generating, by the processor, a first controller signal based on the first set of feedback, the characterization tone, the electric motor speed command, and a controller gain.

At block 510, the method 500 comprises outputting the first controller signal by the processor. At block 512, the method 500 comprises receiving a second set of feedback from the electric motor by the processor, where the second set of feedback is based on the first controller signal. At block 514, the method 500 comprises determining an electric motor windings resistance parameter and an electric motor inductance parameter by the processor based on a frequency component of the second set of feedback associated with the characterization tone. At block 516, the method 500 comprises determining, by the processor, a new value of the controller gain based on the determined electric motor windings resistance parameter and the determined electric motor windings inductance parameter, where the new value of the controller gain is usable to generate a second controller signal in a subsequent iteration of the motor control application.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
   a tone generator configured to couple to a motor gain circuit and configured to provide a characterization tone signal to the motor gain circuit, wherein the motor gain circuit is associated with a motor, and the characterization tone signal has a frequency outside of an operating frequency range of the motor;
a parameter circuit configured to:
   couple to the motor to receive a set of phase current signals; and
   determine a response of the motor to the characterization tone signal by separating the characterization tone signal from the set of phase current signals; and
a gain adjustment circuit coupled to the parameter circuit and configured to:
   couple to the motor gain circuit;
   determine a gain adjustment based on the response of the motor to the characterization tone signal; and
   provide the gain adjustment to the motor gain circuit.

2. The system of claim 1, wherein:
the parameter circuit is configured to determine a set of operating parameters of the motor based on the response of the motor to the characterization tone signal; and
the gain adjustment circuit is configured to determine the gain adjustment based on the set of operating parameters of the motor.

3. The system of claim 2, wherein the set of operating parameters includes at least one of: a motor winding resistance or a motor winding inductance.

4. The system of claim 1, further comprising a summation circuit coupled to the tone generator and configured to:
receive the characterization tone signal from the tone generator;
receive a motor current command signal;
sum the characterization tone signal and the motor current command signal to produce a summed signal; and
provide the summed signal to the motor gain circuit.

5. The system of claim 4, wherein:
the set of phase current signals are in response to the characterization tone signal and the motor current command signal; and
the parameter circuit is configured to distinguish the response of the motor to the characterization tone signal from a response of the motor to the motor current command signal.

6. The system of claim 5, wherein the parameter circuit is configured to distinguish the response of the motor to the characterization tone signal from the response of the motor to the motor current command signal by:
performing a Fourier transform on a gain signal produced by the motor gain circuit to determine a voltage spectrum;
determining a component of the voltage spectrum within a frequency band of the characterization tone signal;
performing a Fourier transform on the set of phase current signals to determine a current spectrum; and
determining a component of the current spectrum within the frequency band of the characterization tone signal.

7. The system of claim 1, wherein the characterization tone signal has a nominal frequency at least one decade above the operating frequency range of the motor.

8. The system of claim 7, wherein the nominal frequency is between about 800 Hz and about 2500 Hz.

9. The system of claim 1, further comprising the motor gain circuit coupled to the tone generator and the gain adjustment circuit.

10. A non-transitory memory storing instructions that, when executed by at least one processor, cause the at least one processor to:

generate a characterization tone signal that has a nominal frequency that is outside of an operating frequency range of a motor;
apply a gain function to the characterization tone signal to produce a gain signal;
provide a control signal for the motor based on the gain signal;
receive a set of phase current signals associated with operation of the motor;
determine a response of the motor to the characterization tone signal by separating the characterization tone signal from the set of phase current signals; and
determine a gain adjustment based on the response of the motor to the characterization tone signal.

11. The non-transitory memory of claim 10, storing further instructions to:
determine a set of operating parameters of the motor based on the response of the motor to the characterization tone signal; and
determine the gain adjustment based on the set of operating parameters.

12. The non-transitory memory of claim 11, wherein the set of operating parameters includes at least one of: a motor winding resistance or a motor winding inductance.

13. The non-transitory memory of claim 12, storing further instructions to determine a short condition of the motor based on the at least one of: the motor winding resistance or the motor winding inductance.

14. The non-transitory memory of claim 10, storing further instructions to:
receive a motor current command signal;
sum the motor current command signal with the characterization tone signal; and
apply the gain function to the summed motor current command signal and characterization tone signal to produce a gain signal.

15. The non-transitory memory of claim 14, storing further instructions to distinguish, based on the set of phase current signals, the response of the motor to the characterization tone signal from a response of the motor to the motor current command signal.

16. The non-transitory memory of claim 15, wherein the instructions to distinguish the response of the motor to the characterization tone signal from the response of the motor to the motor current command signal include instructions to:
perform a Fourier transform on the gain signal to determine a voltage spectrum;
determine a component of the voltage spectrum within a frequency band of the characterization tone signal;
perform a Fourier transform on the set of phase current signals to determine a current spectrum; and
determine a component of the current spectrum within the frequency band of the characterization tone signal.

17. The non-transitory memory of claim 10, wherein the characterization tone signal has a nominal frequency at least one decade above the operating frequency range of the motor.

18. The non-transitory memory of claim 10, wherein the nominal frequency is between about 800 Hz and about 2500 Hz.

19. The non-transitory memory of claim 10, wherein the control signal is a pulse width modulation signal.

20. The non-transitory memory of claim 10, wherein the control signal includes a set of pulse width modulation signal each associated with a respective phase.

* * * * *